United States Patent [19]

Tomita et al.

[11] 4,108,675

[45] Aug. 22, 1978

[54] BRICK FOR SLIDING CLOSURE OF VESSEL FOR HOLDING MOLTEN METAL

[75] Inventors: Yoshimori Tomita, Tajimi; Hideyoshi Ozeki, Gifu; Hisashi Takashima, Tajimi, all of Japan

[73] Assignees: Nippon Kokan Kabushiki Kaisha; Tokyo Yogyo Kabushiki Kaisha, both of Tokyo, Japan

[21] Appl. No.: 795,904

[22] Filed: May 11, 1977

Related U.S. Application Data

[62] Division of Ser. No. 651,143, Jan. 21, 1976, abandoned.

[30] Foreign Application Priority Data

Jan. 29, 1975 [JP] Japan ................................. 50-11400

[51] Int. Cl.$^2$ ............................................. C04B 35/52
[52] U.S. Cl. ...................................... 106/56; 222/600
[58] Field of Search ......................... 106/56; 266/271; 222/600

[56] References Cited

U.S. PATENT DOCUMENTS

| 3,261,698 | 7/1966 | Whittemore et al. ................. 106/56 |
| 3,484,026 | 12/1969 | Zehnder ............................... 222/600 |
| 3,682,839 | 8/1972 | Galloway .............................. 106/56 |
| 3,731,912 | 5/1973 | Kutzer ................................. 222/600 |
| 3,810,768 | 5/1974 | Parsons et al. ........................ 106/56 |

Primary Examiner—J. Poer
Attorney, Agent, or Firm—Haseltine, Lake & Waters

[57] ABSTRACT

A brick for a slide closure of a vessel for holding molten metal. The brick is made by forming and then subjecting to reducing-burninng a compound comprising an acid or neutral refractory material as a base material, graphite and a binding agent.

10 Claims, 2 Drawing Figures

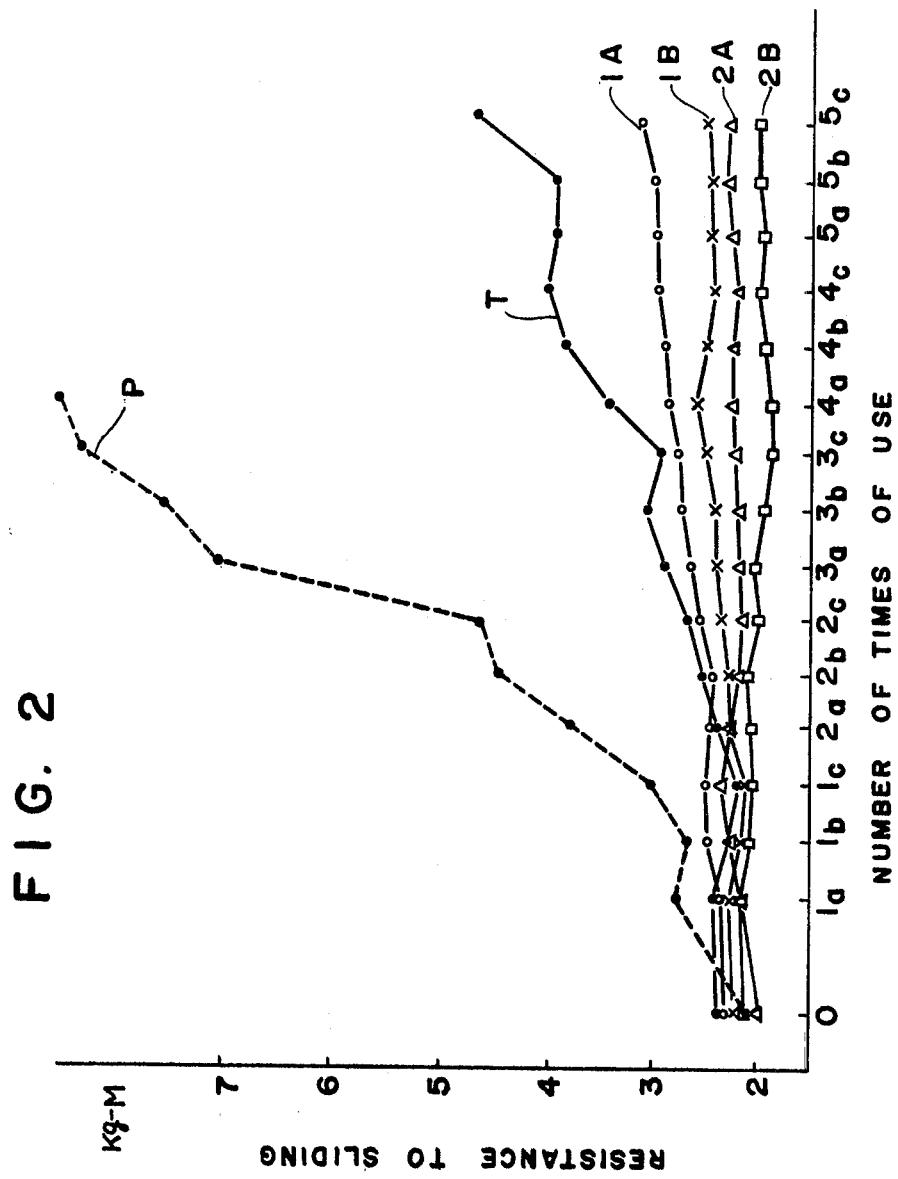

BRICK FOR SLIDING CLOSURE OF VESSEL FOR HOLDING MOLTEN METAL

This is a division of application Ser. No. 651,143 filed Jan. 21, 1976 now abandoned.

The present invention relates to a brick for the slide closure of a vessel for holding molten metal such as a ladle or smelting furnace.

As is well known in the art, a conventional slide closure of the above type comprises, as shown in FIG. 1 of the accompanying drawings, an upper nozzle 3 fixedly mounted in the bottom portion of a vessel (including a lining 1 and a bottom plate 2 of the vessel), a fixed plate brick 4 fixedly held in place in contact with the upper nozzle 3 and having an opening communicating with the opening in the upper nozzle 3, a sliding plate brick 5 held in sliding contact with the fixed plate brick 4 and having an opening that can be communicated with the opening in the fixed plate brick 4 and a collector nozzle 6 fixedly mounted on the sliding plate brick 5 to be movable therewith and having an opening communicating with the opening in the sliding plate brick 5, and these component parts are supported by a framework which is not shown. The slide closure serves to discharge the molten metal contained in the vessel by sliding the sliding plate brick 5 so that its opening communicates with the opening in the fixed plate brick 4 or alternately the slide closure serves the purpose of stopping the discharging of the molten metal by sliding the sliding plate brick 5 so that the opening in the fixed plate brick 4 is closed by the portion of the sliding plate brick 5 where no opening is present. There are two methods of sliding the sliding plate brick 5, namely, a linear motion method and a rotary motion method. An electric motor or such power as hydraulic pressure or pneumatic pressure is utilized for driving the slide closure. The plate bricks for such slide closure, i.e., the fixed plate brick and sliding plate brick are required to possess such properties as corrosion resistance, thermal shock resistance and smoothness and it has been customary to make the desired plate brick from high-alumina brick, zircon brick, silicon nitride brick or the like by impregnating it with pitch, tar, organic resin or the like. Examples of such plate bricks are disclosed in the published Japanese Patent Application No. 38049/72. The conventional processing method of this type is effective in producing fairly good results with respect to the properties of the resulting plate bricks such as the lubricity necessary for the sliding motion of the plate brick during the pouring operation, corrosion resistance, wear resistance and the property for preventing the adhesion of molten metal, slag, etc., to the plate brick. However, it should be noted that these plate bricks for slide closure are generally used repeatedly several times. Moreover, since the minor portion of the plate brick surrounding the opening is heated to elevated temperatures by contacting with the molten metal discharged from the vessel and the remaining portion of the plate brick is heated only by virtue of the heat conduction, the distribution of temperature in the same plate brick is caused to differ considerably between the different parts thereof. For example, when the molten steel in the vessel is discharged, the temperature of that portion of the plate brick which contacts with the molten steel rises to about 1600° C, while the temperature of the other portion which is remotest from the portion surrounding the opening rises to only about 50° C.

Consequently, a disadvantage of the conventional plate bricks is that as the plate brick is used repeatedly, the volatile matters and carbon or carbonaceous substances ooze out from the impregnant and these substances non-uniformly stick to the surface of the plate brick deteriorating the lubricity of the brick and increasing the resistance to sliding. While the driving force for driving the plate bricks may be increased in an attempt to overcome the above-mentioned drawback, this attempt is also disadvantageous in that as the plate bricks are slid, the molten metal is drawn in between the contacting surfaces of the plate bricks giving rise to the danger of causing a leakage of the molten metal and moreover this naturally necessitates the use of larger equipment with the accompanying operating difficulty. For these reasons, increasing the driving power cannot be considered as a satisfactorily effective measure. In addition, the substances oozed out from the impregnant constitute causes of environmental contamination and thus there has existed a need for an effective countermeasure.

With a view to overcoming the foregoing deficiencies of the conventional plate bricks for slide closure, it is the object of the present invention to provide an improved brick for slide closure having a reduced resistance to sliding and improved corrosion resistance and thermal shock resistance and capable of being used repeatedly without deteriorating its performance.

In accordance with the present invention, there is thus provided an improved refractory brick for slide closure which is made by forming and subjecting to reducing-burning a compound comprising an acid or neutral refractory material as a base material, 2 to 20% and preferably 3 to 10% of graphite, a binder such as clay, tar or pitch or a mixture thereof and optionally a sintering agent. By further impregnating the burnt product with tar or pitch or a mixture thereof and subjecting the impregnated product to further reducing-burning again to thereby fully remove the volatile matters in the impregnant and fill the pores of the brick with carbon, it is possible to further improve the durability of the brick for slide closure.

The above and other objects, features and advantages of the invention will become readily apparent from the following detailed description taken in conjunction with the accompanying drawings, in which:

FIG. 2 is a graph showing the comparative performance of plate bricks for slide closure prepared according to the teachings of the invention and the conventional plate bricks for slide closure.

Figure 1:
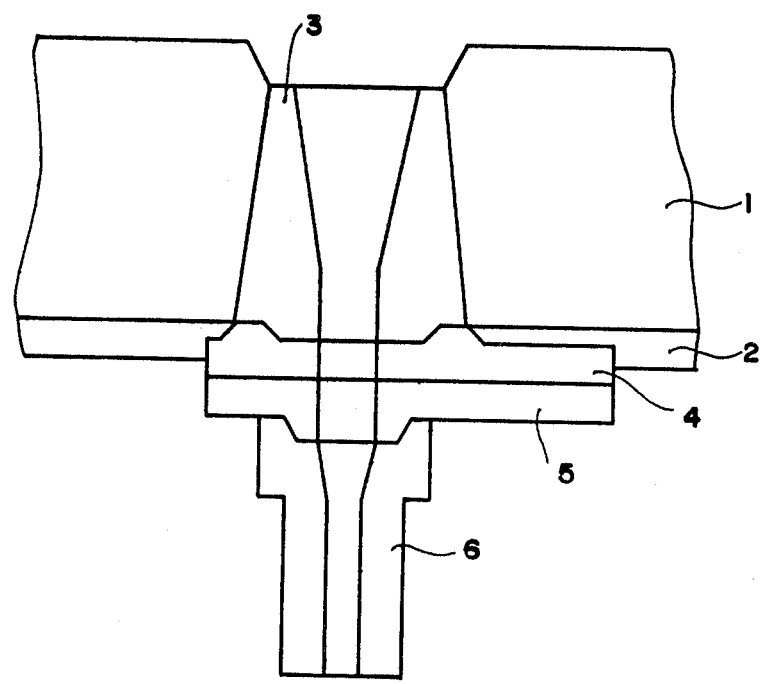
FIG. 1 is a schematic sectional view of a conventional slide closure.

The present invention will now be described in greater detail.

In preparing the brick for the purposes described, various materials, such as burnt clay, high siliceous material, high aluminous material or high-zirconia material may be used as an acidic or neutral refractory material for the base material of the brick and the proportion of added graphite is determined in consideration of the strength and formability of the brick. Although graphite may be earthy graphite or artificial graphite, it is most preferable from the viewpoint of slidability to use flaky graphite in fine powder form.

As a binding agent, 2 to 30% of clay or 3 to 30% of tar or pitch or their mixture is used. Other organic binder such as lignin, ammonium alginate or phenolic resin may be used.

The resulting composition may additionally contain 1 to 10% of silicon carbide or silicon nitride or their mixture, metallic silicon or ferrosilicon for ensuring an improved sintering property and strength.

More specifically, the best results may be obtained with respect to the strength and thermal shock resistance of the brick if bond clay is added in an amount between 10 and 30% in the case where the base material is burnt clay or high siliceous material and in an amount between 2 to 10% in the case where the base material is neutral refractory material such as high aluminous material. On the other hand, if tar or pitch is used as the binding agent, though the graphite content must be taken into consideration, it is desirable that the composition containing 10 to 20% of tar or pitch is kneaded while heating it and then the temperature of the composition is lowered before the forming operation to proper temperature to increase the viscosity up to the optimum viscosity. In this case, the composition may include any additional binding clay.

Further, if silicon carbide or the like is added to the composition for the purpose of improving the sintering property and strength, the addition of 2 to 8% of finely crushed silicon carbide or the like can produce the best results from the standpoint of preventing oxidization of carbon and providing improved strength.

After the thus prepared composition has been formed, the formed composition is placed in a reducing vessel such as a graphite crucible which is then filled with carbonaceous particles to exclude the air from contacting the formed article and the formed article is subjected to reducing-burning in a kiln. The plate brick produced in this way has a reduced and stable resistance to sliding, an improved corrosion resistance, thermal shock resistance, strength and durability.

In addition, by impregnating the burnt composition with pitch or tar or their mixture and then subjecting it to the similar reducing-burning again, it is possible to fully remove the volatile matters in the impregnant, fill the pores in the brick with carbon and further improve the durability of the brick.

The following examples describe in greater detail the production of the novel plate brick in accordance with this invention.

(1) Compounding of raw materials

The following table shows the constituents, etc. of the bricks made according to the teachings of the invention.

| | Base material | Compounding constituent | Particle size, mm | Proportion % |
|---|---|---|---|---|
| Example 1 | High aluminous material | Sintered alumina | 0.5 – 3 | 50 |
| | | Sintered alumina | <0.5 | 37 |
| | | Flaky graphite | <0.1 | 3 |
| | | Binder clay | <0.1 | 10 |
| Example 2 | High aluminous material | Sintered alumina | 0.5 – 3 | 50 |
| | | Sintered alumina | <0.5 | 30 |
| | | Flaky graphite | <0.1 | 10 |
| | | Tar | | 5 |
| | | Silicon carbide | <0.1 | 5 |
| Example 3 | Burnt clay | Calcined hard clay | 0.5 – 3 | 40 |
| | | Calcined hard clay | <0.5 | 25 |
| | | Flaky graphite | <0.1 | 10 |
| | | Binder clay | <0.2 | 20 |
| | | Silicon carbide | <0.1 | 5 |

In Examples 1 and 3, the clay bond was used. In Example 2, the tar bond was used and the tar had the composition of pitch 70% and anthracene oil 30%. The forming pressure was 500 Kg/cm$^2$ in Examples 1 and 3 and 1200 Kg/cm$^2$ in Example 2.

(2) Burning

Each of the compositions formed in the above-mentioned manner was placed in a graphite crucible and, while shutting out the air by fine particles of coke, was subjected to reducing-burning by passing it through a tunnel kiln (the maximum temperature was 1520° C). The thus prepared bricks possessed excellent properties as the plate bricks for slide closure.

(3) Impregnation and reducing-burning

After the above-mentioned reducing-burning, some of the bricks were further impregnated with tar (having the composition of pitch 70% and anthracene oil 30%) and then subjected to the supplementary process of similar reducing-burning. In the Examples, the impregnation and rereducing-burning were respectively repeated twice.

(4) Properties of brick

The following table shows the properties of the thus produced bricks.

| Physical properties | Example 1 | | Example 2 | | Example 3 | |
|---|---|---|---|---|---|---|
| | A | B | A | B | A | B |
| Bulk specific gravity | 2.56 | 2.75 | 2.68 | 2.79 | 2.19 | 2.40 |
| Porosity, % | 14.6 | 7.6 | 11.2 | 8.4 | 19.0 | 9.4 |
| Compressive strength, Kg/cm$^2$ | 650 | 850 | 800 | 940 | 400 | 750 |
| Softening point T$_2$ under load at 2 Kg/cm$^2$) | No softening at 1750° C | No softening at 1750° C | No softening at 1750° C | No softening at 1750° C | 1530° C | 1590° C |

In the above table, symbol A designates the bricks which were not subjected to the impregnation and additional rereducing-burning and B designates the bricks which were subjected to the impregnation and additional rereducing-burning. The softening point T$_2$ represents the softening point under load obtained by the testing method according to the Japanese Industrial Standard R 2209, namely, the temperature attained at the time that the height of a test piece is compressed by 2% of its initial height by further heating it after the heating temperature has reached a softening starting point ($T_1$).

The practical results of the above-described various bricks for slide closure showed the following advantages over the conventional bricks impregnated with tar or pitch: (1) Contamination by the impregnant was prevented. (2) Increase in the resistance to sliding due to the oozing out of the impregnant was eliminated. (3) Life of the bricks was increased by over 20%.

FIG. 2 is a graph showing the comparative performance of the plate bricks for slide closure prepared according to the invention and the conventional plate bricks for slide closure. In the Figure, the ordinate represents the resistance to sliding and the abscissa represents the number of times of use of the plate bricks. Numeral 0 shows that the plate bricks are still to be used and numerals 1 et seq. designate the number of times of use of the plate bricks (i.e., the first time, second time et seq.), while alphabetical letters a, b and c respectively indicate the starting of use, the adjusting of the flow rate during the discharging and the end of the discharging. The curve 1A indicates the variation in the resistance to sliding of the brick according to the Example 1A of the invention, the curve 1B that of the brick according to the Example 1B of the invention, the curve 2A that of the brick according to the Example 2A of the invention and the curve 2B that of the brick according to the Example 2B of the invention.

The curve T and P respectively indicate the variation in the resistance to sliding of the conventional bricks impregnated with tar and pitch, respectively. In contrast to the fact that the resistance to sliding of the conventional bricks increased considerably as the number of times of use increased, the resistance to sliding of the bricks according to the invention did not practically show any increase and were extremely stable.

On the other hand, as regards the properties relating to the resistance to sliding, there was no marked difference between the bricks containing over 10% of graphite and the bricks containing 10% of graphite. However, the addition of graphite in amounts greater than 20% was not beneficial in consideration of the resulting difficulty in the manufacture of bricks, deterioration of the strength and manufacturing costs.

As will be seen from the above-described examples of the invention, the refractory bricks made according to the teachings of the invention are extremely suitable for constructing a slide closure for molten metal vessels.

What is claimed is:

1. In a vessel for holding molten metal which comprises an outlet having a slide closure in the form of a brick, the improvement comprising a brick which is impermeable to said molten metal and is made by forming and subjecting to reducing-burning a composition comprising an acid or neutral refractory material as a base material, 3 to 10% of graphite powder, and a binding agent selected from the group consisting of clay; tar; pitch; a mixture of tar and pitch; lignin; ammonium alginate; and phenolic resins.

2. In a vessel for holding molten metal which comprises an outlet having a slide closure in the form of a brick, the improvement comprising a brick which is impermeable to said molten metal and is made by forming and subjecting to reducing-burning a composition comprising an acid or neutral refractory material as a base material, 3 to 10% of graphite powder, and a binding agent selected from the group consisting of clay; tar; pitch; a mixture of tar and pitch; lignin; ammonium alginate; and phenolic resins, impregnating the burnt product with an impregnant selected from the group consisting of tar, pitch and mixtures of tar and pitch, and further subjecting said impregnated product to reducing-burning to thereby completely remove the volatile matters in said impregnant and fill the pores in said brick with carbon.

3. The improvement of claim 1 wherein the binding agent is clay in an amount between 2 and 30%.

4. The improvement of claim 2 wherein the binding agent is clay in an amount between 2 and 30%.

5. The improvement of claim 1 wherein the binding agent is tar or pitch in an amount between 3 and 30%.

6. The improvement of claim 2 wherein the binding agent is tar or pitch in an amount between 3 and 30%.

7. The improvement of claim 1 further comprising between 1 and 10% of a sintering agent selected from the group consisting of silicon carbide, silicon nitride, a mixture of silicon carbide and silicon nitride, metallic silicon and ferrosilicon.

8. The improvement of claim 2 further comprising between 1 and 10% of a sintering agent selected from the group consisting of silicon carbide, silicon nitride, a mixture of silicon carbide and silicon nitride, metallic silicon and ferrosilicon.

9. The improvement of claim 1 wherein the graphite has a particle size less than 0.1 mm.

10. The improvement of claim 2 wherein the graphite has a particle size less than 0.1 mm.

* * * * *